United States Patent
Meyringer

(10) Patent No.: US 7,050,056 B2
(45) Date of Patent: May 23, 2006

(54) INTERACTIVE AND WEB-BASED GANTT CHART

(75) Inventor: Michael Meyringer, Rauenberg (DE)

(73) Assignee: SAP Aktiengesellschaft, Waldorf (DE)

( * ) Notice: Subject to any disclaimer, the term of this patent is extended or adjusted under 35 U.S.C. 154(b) by 249 days.

(21) Appl. No.: 10/327,686

(22) Filed: Dec. 20, 2002

(65) Prior Publication Data

US 2004/0119713 A1 Jun. 24, 2004

(51) Int. Cl.
*G09T 11/20* (2006.01)

(52) U.S. Cl. .................................. 345/440; 345/749
(58) Field of Classification Search ................. 345/440, 345/748, 749; 705/12
See application file for complete search history.

(56) References Cited

U.S. PATENT DOCUMENTS

| | | | | |
|---|---|---|---|---|
| 5,414,809 A | * | 5/1995 | Hogan et al. | 345/440 |
| 6,018,346 A | * | 1/2000 | Moran et al. | 705/12 |
| 6,674,450 B1 | * | 1/2004 | Toub et al. | 345/749 |
| 6,708,293 B1 | * | 3/2004 | Kaler et al. | 714/39 |

OTHER PUBLICATIONS

"*Gantt Chart—2.x*", 1997–2003, webWise Network Consultants Pty Ltd, pp. 1–6.
"*Varchart, XGantt, The ActiveX Control for Gantt Applications*", Netronic Software GmbH, Germany, 6 pages, Feb. 2002.

* cited by examiner

*Primary Examiner*—Matthew Luu
(74) *Attorney, Agent, or Firm*—Fish & Richardson P.C.

(57) ABSTRACT

Computer-implemented methods and computer program products implement techniques for representing a project in a web application. The techniques include generating, through a Web server, a description of a project in HTML code, creating a graphic display of at least a portion of the project in the form of a chart in a browser, receiving user input manipulating the HTML element in the graphic display of the chart, and dynamically updating the graphic display of the chart in response to the user input with a plurality of instructions that manipulate the document object model of the browser. The browser includes a document object model and the chart includes a graphic representation of an HTML element.

20 Claims, 4 Drawing Sheets

INTERACTIVE AND WEB-BASED GANTT CHART

BACKGROUND

The following disclosure relates to data processing and more particularly to project and process development.

Project development systems allow a user to, e.g., develop and manage a project. These systems support various types of projects including marketing projects, design projects, manufacturing projects, consulting projects, development projects, and any combination thereof. Project development systems can include project development applications that run on computing devices for managing one or more projects.

Project development systems often use a project structure to describe a given project. In general, a project structure maps real-world aspects of a project, such as timelines and tasks, into an electronically accessible format. For example, many project development systems describe a start, finish, and other schedule dates of a project, the tasks that are performed and the results that are achieved during the project, and the data objects that are generated by the project or used to complete the project.

A Gantt Chart is an example of a project structure that can be used to describe a given project. A Gantt Chart is a graphical representation that shows the time dependency of several tasks of a project within a calendar. A Gantt Chart provides a graphical illustration of a schedule that helps to plan, coordinate, and track specific tasks in a project.

FIG. 1 shows an example Gantt Chart 100. The Gantt Chart 100 includes a calendar 102 constructed with a horizontal axis 104 and a vertical axis 106. The horizontal axis 104 represents the total time span of the project. The time span of the project can be broken down into divisions (or increments), e.g., days, weeks, or months. The vertical axis 106 represents the tasks associated with the project. Horizontal bars 108 of varying lengths represent the sequences, timing, and duration for each task. The horizontal bars 108 can be connected with arrows 110 that represent relationships or dependencies between tasks. A table (or hierarchy diagram) 112 can be displayed next to the Gantt Chart that contains additional information about the tasks.

SUMMARY

This specification describes methods and apparatus, including computer program products, implementing techniques for dynamically and graphically representing a project in an interactive Web-based Gantt Chart. A Gantt Chart can be embedded into a Web application. The embedded Gantt Chart can use only HTML and JavaScript as well as HTTP communication between server and client (Web browser) for interaction with a user. The Gantt Chart can be sent to users, working together on a project, through Web pages of the World Wide Web which contain data objects of the project, formatted in the hypertext markup language ("HTML"). The Gantt Chart can be accessed through a desktop browser and multiple users can access the Gantt Chart for multiple reasons at the same time. A scripting language, e.g., JavaScript, provides users a characteristic "look and feel" of data objects being manipulated within the Gantt Chart displayed in the browser. The manipulation of the data objects within the Gantt Chart is largely independent of the specific user operating system.

In general, in one aspect, the invention features computer-implemented methods and computer program products, implementing techniques for representing a project in a web application. The techniques include generating, through a Web server, a description of a project in HTML code, creating a graphic display of at least a portion of the project in the form of a chart in a browser, receiving user input manipulating the HTML element in the graphic display of the chart, and dynamically updating the graphic display of the chart in response to the user input with a plurality of instructions that manipulate the document object model of the browser. The browser includes a document object model and the chart includes a graphic representation of an HTML element.

Particular implementations can include one or more of the following features. The chart can be a Gantt Chart representing the project in the web application. The plurality of instructions can be contained within a computer program. The computer program can be written in a scripting language and the scripting language can comprise of JavaScript programming language. Creating a description of a project in HTML Code can include generating HTML code that registers scripting language functions to handle events and that contains elements for interaction dialog with the user in the browser. The events can be user input actions or state changes of HTML elements. The scripting language functions can store information about kind and parameters of the user input actions in hidden HTML input elements and can send a request to the Web server for updating the HTML code of the Gantt Chart.

The systems and techniques described in this specification may provide one or more of the following advantages. Java applets components or ActiveX controls do not need to be installed (either at the server or client) to run the interactive Gantt Chart. A complex program logic, such as used in the ActiveX controls or Java applet components, are not necessary to support user interaction with the Gantt Chart. The elements can comprise hidden elements not to be displayed in the browser and visible elements to be displayed in the browser.

An interactive Gantt Chart provides a central access point for displaying, administrating, and monitoring all project-relevant data objects. By creating a central entry point for development projects, all project-related objects including backend integration, can be displayed, managed, and monitored more efficiently. Most of the Gantt Chart implementation may be based only on elements and methods described in W3C (World Wide Web Consortium) standards and does not use functions specific to a browser manufacturer. The Gantt Chart can run on browsers of several manufacturers that fulfill W3C standards.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
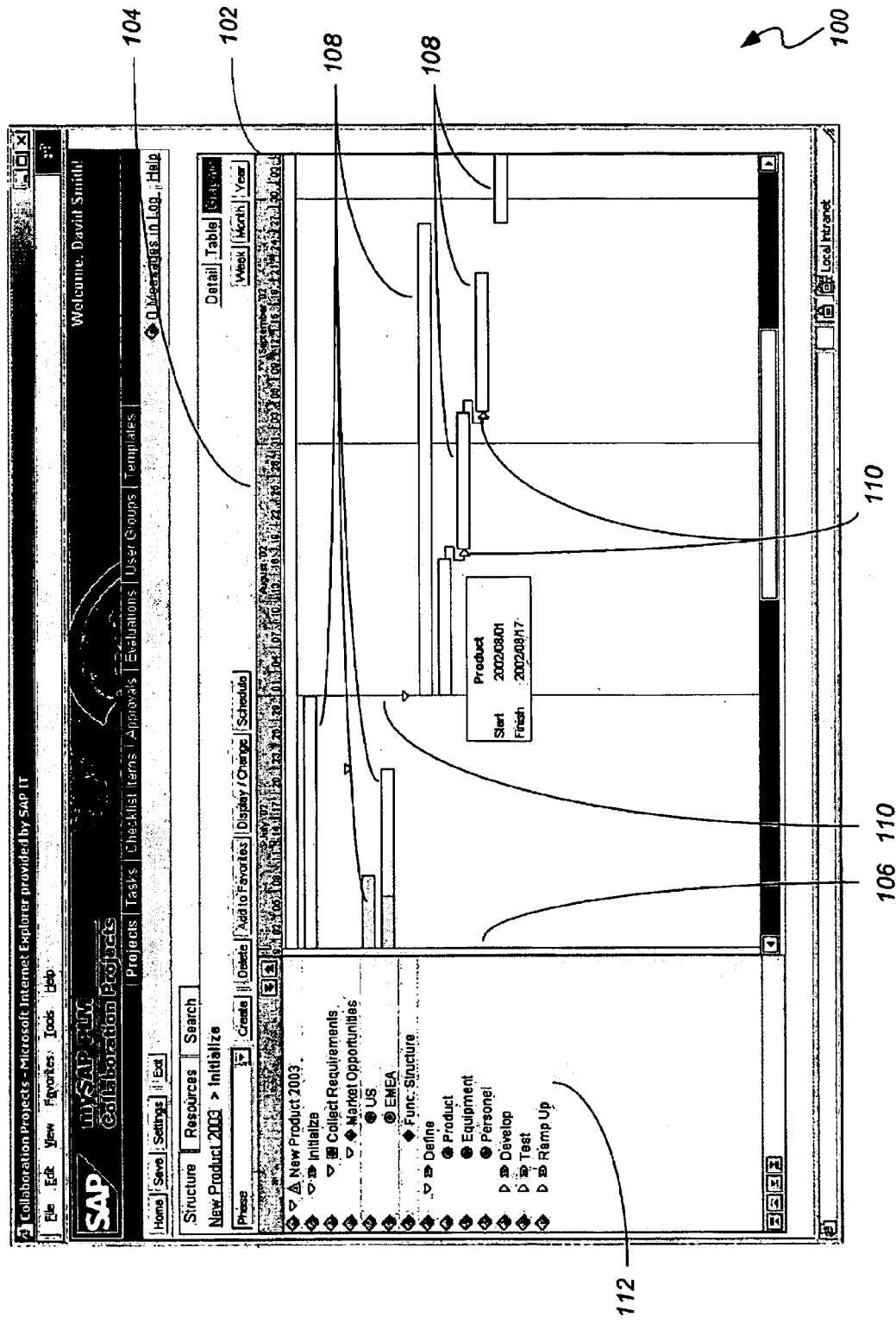
FIG. 1 shows a graphical representation of a project in a Gantt Chart.
Figure 2:
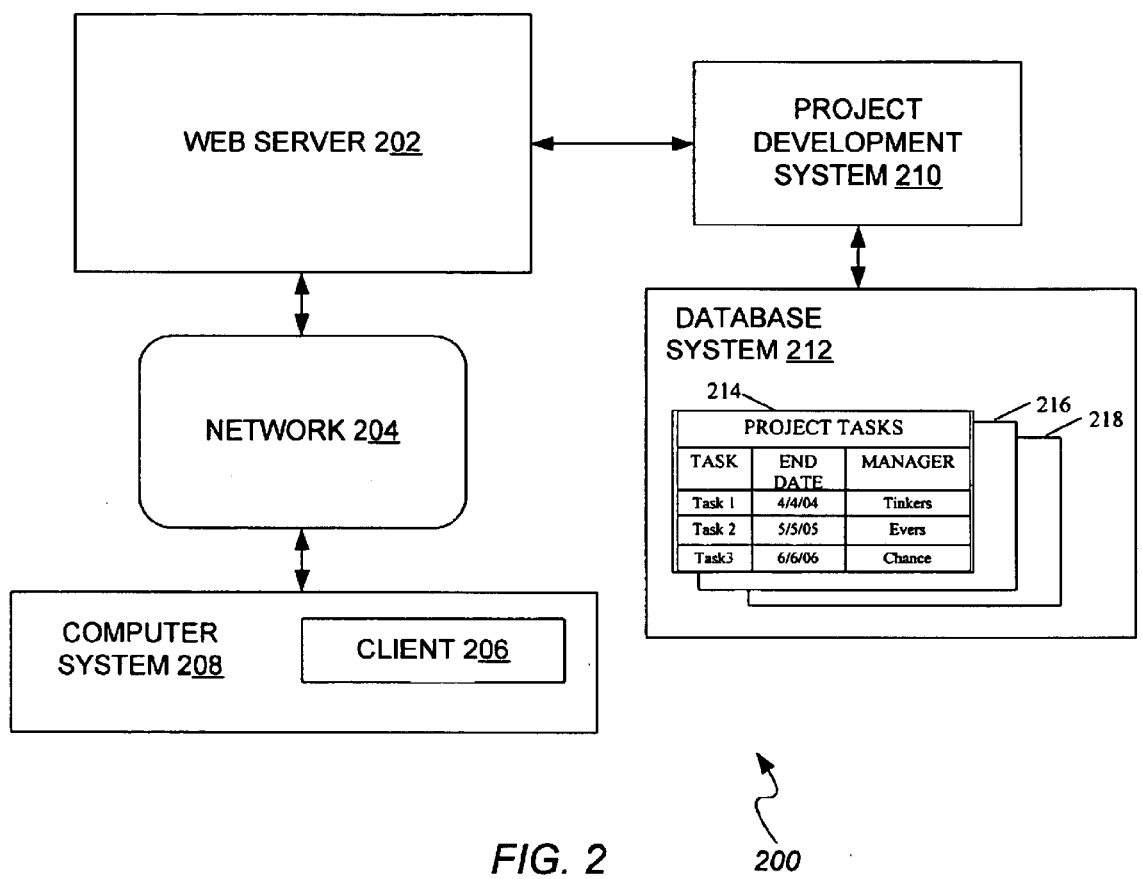
FIG. 2 shows a system for graphically and dynamically representing a project in an interactive Web-based Gantt Chart.

FIG. 2 is a block diagram of a system 200 suitable for dynamically and graphically representing a project in a Web-based Gantt Chart. In one implementation, system 200 includes an application server, illustrated as Web server 202, that is connected to a network 204. In one implementation, network 204 includes a worldwide collection of networks and connection devices using various protocols to communicate with one another (e.g., the Internet). These protocols may include the Lightweight Directory Access Protocol (LDAP), the Transport Control Protocol/Internet Protocol (TCP/IP) suite of protocols, the Hypertext Transport Protocol (HTTP), the Wireless Application Protocol (WAP), and other suitable communication protocols.

System 200 as depicted in FIG. 2 communicates with a client application 206. In one implementation, the client application 206 is a browser application capable of displaying Web pages retrieved from Web server 202 using standardized Web page addressing formats. Thus, the browser can display various types of content in addition to Web pages. Moreover, the location of the content may be represented with a variety of addresses, such as Uniform Resource Locators (URLs) and Uniform Resource Identifiers (URIs).

The Web server 202 can host a project development system 210 and a database system 212. The database system 212 stores a collection of objects 214, 216, 218 or other data that describe a project. The project development system 210 is an application that stores and executes a project development application. The project development system 210 can be an application such as Collaboration Projects (cprojects) Suite 2.0, available from SAP AG, located in Walldorf, Germany. The cprojects application is based on an SAP Web Application Server (SAP Basis System 6.20) and is a stand-alone application that can be implemented independent of other SAP or non-SAP components. The cProjects application can also be integrated in a heterogeneous system landscape without modifications. Web server 202 accesses objects 214, 216, 218 while executing the project development application to develop and manage the project. The client (e.g., browser) 206 communicates with Web server 202 during execution of the project development application. For example, the browser can receive information and instructions for dynamically and graphically representing a project in a Gantt Chart displayed on a display device.

Figure 3:
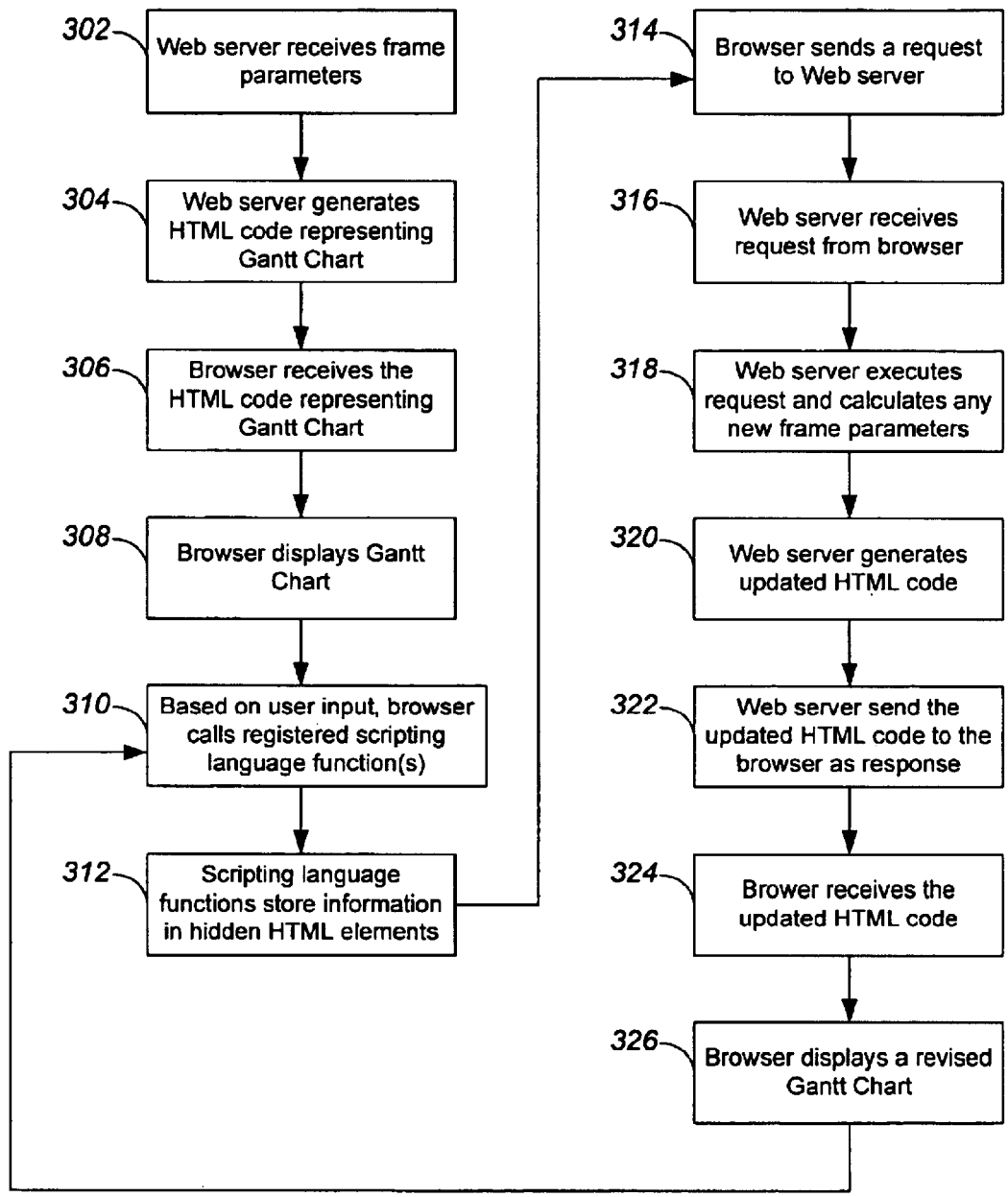
FIG. 3 is a flowchart of a process for providing an interactive Web-based Gantt Chart.

FIG. 3. shows a process 300 for providing an interactive Web-based Gantt Chart that can be displayed by a browser. The process starts with a Web server 202 receiving frame parameters (step 302). In one implementation, the frame parameters include the calendar and the details of the HTML elements that are to be displayed within the calendar. The frame parameters of the calendar include data objects that describe, e.g., start and finish date of a project and division. The frame parameters of the details of the objects to be displayed within the calendar include data objects that contain information describing, for example, dates, duration of tasks, a unique identification (ID) of each of the elements, and relations between the elements. In one implementation, the Web server 202 receives data objects generated by the project development system 210.

The Web server 202 generates HTML code representing the Gantt Chart (step 304). In one implementation, the HTML code contains visible HTML elements and hidden HTML elements. A visible HTML element is displayed and a hidden HTML element is not displayed. Hidden HTML elements can contain information about an event. Events are defined as certain state changes of HTML elements or user input actions, e.g., a mouse click. Other hidden HTML elements can be made visible during an event.

The HTML code generated by the Web server contains elements that register scripting language functions to handle events. In one implementation, the scripting language functions are JavaScript functions, as described in greater detail below. Interactive functions are triggered by events, which the browser sends, e.g., on mouse actions while the mouse cursor is positioned within the Gantt Chart area. In this implementation, JavaScript functions are registered on the following events: OnMouseDown, OnMouseUp, OnMouseMove, and OnMouseOut. The event OnMouseDown is triggered when the user presses the left mouse button. The event OnMouseUp is triggered when the user releases the left mouse button. The event OnMouseMove is triggered when the user moves the mouse cursor. The event OnMouseOut is triggered when the user moves the mouse cursor out of the boundaries of a HTML element.

The HTML code generated by the Web server 202 also contains elements that are used for the interaction dialog on the client side (browser-side). In one implementation, the Gantt Chart supports the following interactive actions: display tooltip window, change appearance of mouse cursor, move horizontal bar, resize horizontal bar, link action, and scroll calendar range of the Gantt Chart. Each of these interactive actions will now be explained.

The Gantt Chart can display a tooltip window. In one implementation, when the user moves the mouse cursor above a bar in the Gantt Chart, a tooltip window (or an information box) becomes visible next to the current position of the mouse cursor. The tooltip window can contain the ID of the object that is visualized with the bar as well as the start and finish date of the object.

The Gantt Chart can change the appearance of the mouse cursor. In one implementation, depending on the position of the mouse cursor relative to the bar, the appearance of the mouse cursor changes to indicate, that the user may move (e.g., cross arrow—above the body of the bar) or lengthen/shorten (e.g., horizontal arrow—right end of the bar) the bar.

A horizontal bar can be moved within the Gantt Chart. In one implementation, if the appearance of the cursor indicates the bar may be moved and the user clicks on the bar, an additional bar with a dotted border becomes visible at the same position and with the same size like the clicked bar. If the user moves the mouse in horizontal direction while keeping the mouse button pressed, the bar with the dotted border follows the horizontal movement of the mouse cursor. Further, the tooltip window displays the start and finish dates corresponding to the current position of the horizontal bar.

A horizontal bar can be resized within the Gantt Chart. In one implementation, if the appearance of the cursor indicates the bar may be lengthened/shortened and the user clicks on the bar, an additional bar with a dotted border becomes visible at the same position and with the same size like the clicked bar. If the user moves the mouse in horizontal direction while keeping the mouse button pressed, the bar with the dotted border is lengthened/shortened corresponding to the horizontal movement of the mouse cursor. Further, the tooltip window displays the start and finish dates corresponding to the current position of the horizontal bar.

A link action can be performed within the Gantt Chart. In one implementation, if the user moves the mouse cursor during either a move or a lengthen/shorten action in a vertical direction (while keeping the mouse button pressed)

the system switches to a link action. The text of the tooltip window changes to indicate the link action and the name (ID) of the currently clicked bar is displayed as predecessor. When the user moves the mouse cursor above another suitable bar, the name (ID) of this bar is displayed in the tooltip window as successor.

Figure 4:
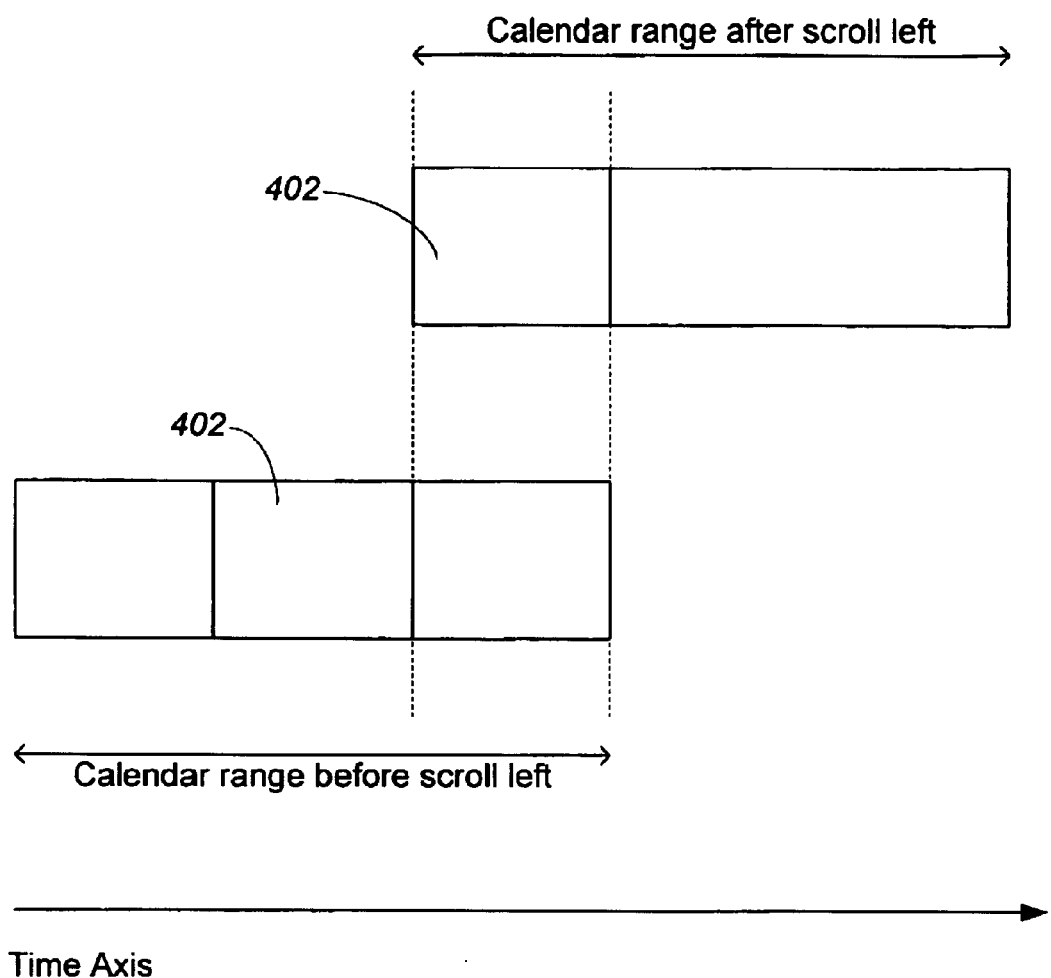
FIG. 4 illustrates a visible portion of the Gantt Chart as a user scrolls the calendar to the left.

The calendar range of the Gantt Chart can be scrolled to the left or to the right. The HTML code generated for the Gantt chart can contain a limited calendar range for display. In one implementation, approximately one-third of the calendar range is visible at a time, as shown in FIG. 4. The visible portion of the calendar is designated as area 402 in FIG. 4. A user can display other areas of the limited calendar range by, e.g., moving a scrollbar located at the bottom of the Gantt Chart.

As shown in FIG. 3, the client (e.g., browser) 206 receives the HTML code as part of a Web page (step 306) and displays the Gantt Chart (step 308). The browser calls the registered scripting language function(s) (step 310) according to user input manipulating a cursor about the Gantt Chart. In one implementation, the browser calls registered JavaScript functions when the user moves a mouse cursor above a bar within the Gantt Chart or clicks on HTML elements within the Gantt Chart. Depending on the position of the mouse cursor the JavaScript functions make hidden HTML elements visible and indicate to the user which kind of action the user will trigger. To achieve this, the JavaScript functions manipulate the Document Object Model (DOM) of the browser—this technique is called dynamic HTML (DHTML). Typically, the interactive Gantt Chart applications that are built using ActiveX controls or Java applet components do not manipulate the DOM of the browser, i.e., these applications do not use browser capabilities (DOM/HTML elements) for the graphical visualization of the Gantt Chart. Generally, interactive Gantt Chart applications that are built using ActiveX controls or Java applet components operate using drawing functions such as GDI (Graphical Device Interface from Microsoft for ActiveX controls) or Spice (drawing library for Java applets).

The scripting language functions store information about kind and parameters of the action in HTML input elements (these elements are hidden) (step 312) and send a request to the Web server (step 314). In one implementation, the JavaScript functions store information about kind and parameters of the action in HTML input elements when the user releases a mouse button at a suitable position. For example, in one implementation, when the user releases the mouse button after moving a horizontal bar or resizing a length of a horizontal bar within the Gantt Chart, information about the kind of action (move or lengthen/shorten), the ID of the affected bar, and the date that corresponds to the bar position is sent with a request to the Web server. In another implementation, when the user releases the mouse button after linking two horizontal bars, a request is sent to the server with information about the kind of action (link) and the ID's of the predecessor and successor bars. Also, in one implementation, when the user moves the scrollbar to its left or right limited position and clicks on the left or right scroll button respectively, information about the kind of action (scroll left/right) is sent with a request to the server.

The Web server receives the request of the JavaScript functions and the values stored in the hidden HTML input elements (step 316). The server executes the requested action and calculates possibly new frame parameters of the calendar or new dates of the elements displayed in the Gantt Chart (step 318). The Web server generates (updated) HTML code that represents the actual state of the Gantt Chart after execution of the action (step 320). For example, if the server receives a request to scroll the calendar range left, the server generates new HTML code for a calendar range to the left of the previously displayed calendar range. The Web server 202 sends the generated HTML code back to the browser as a response (step 322). The browser receives the updated HTML code (step 324) and displays a revised Gantt Chart based on the user interaction (step 326). In the example above, the visible portion of the new calendar range of the Gantt Chart is set to the left as shown in FIG. 4.

The process can return to step 310 to receive more user input.

HTML Code Generated on the Web Server

The following describes an implementation of the HTML code generated by the Web server 202 in step 304 above.

HTML Code for Envelope of Gantt Chart

The entire HTML code for the Gantt Chart is enclosed in one HTML element. This HTML element has special style attributes assigned as shown in Table 1 below.

TABLE 1

| Style attribute | Explanation |
| --- | --- |
| Position: absolute | This enables absolute positioning of HTML elements for the calendar and bars of the Gantt Chart |
| Overflow: auto | Instructs the browser to show scrollbars, if the size of the content exceeds the size of the enclosing HTML element. Thus, it is possible to generate HTML for a wider calendar range |

Table 2 below shows an example of HTML code for the enclosing HTML element. In this example, a division tag is used.

TABLE 2

```
<div class="pgxGChCal"
    id="dpr_wrk_prj_wrk_gch_GanttChart"
    onmousedown="pgxGChOnMouseDown(event);"
    onmousemove="pgxGChOnMouseMove(event);"
    onmouseup="pgxGChOnMouseUp(event);"
    onmouseout="pgxGChOnMouseOut(event);"
    style="height:464px; width:100%;">
    ...
</div>
```

The style attributes are defined in a style sheet class. The definition of the style sheet class in the CSS file appears as shown in Table 3 below.

TABLE 3

```
.pgxGChCal
{
    BORDER: #909cae 1px solid;
    OVERFLOW: auto;
    POSITION: absolute;
}
```

HTML Code for Calendar

The calendar code can be put together from absolute positioned HTML elements for each calendar division in the calendar header and calendar body.

The following HTML code in Table 4 below shows an example for one single division of the calendar header. In this example, a division tag is used. The information about the absolute position, computed for each division individually, is contained in the style attribute.

TABLE 4

```
<div class="pgxGChCalHdr"
      style="left:0;width:221;top:0;height:11;"
      title="2002/04/01">
   April '02
</div>
```

The general style information is defined in a style sheet class as shown below in Table 5.

TABLE 5

```
.pgxGChCalHdr
{
   PADDING: 0px;
   FONT-SIZE: 9px;
   Z-INDEX: 100;
   BACKGROUND: #bfc8d1;
   BORDER-LEFT: #909cae 1px solid;
   FONT-FAMILY: arial,sans-serif;
   POSITION: absolute;
   TEXT-ALIGN: center;
}
```

HTML for Bars

The Web server generates an absolute positioned HTML element for each bar of the Gantt Chart. The HTML element has a unique ID that identifies the bar. Information about properties of the bar is linked to the HTML element. Depending on the browser capabilities this information is stored in subnodes (enclosed HTML elements) or additional attributes (unused by the World Wide Web Consortium (W3C) and browser).

The following HTML code shown in Table 6 below shows an example for a single bar using division tags and subnodes for properties information. The information about the absolute position, computed for each bar individually, is contained in the style attribute.

TABLE 6

```
<div class="pgxGChBar"
      style="left:667;width:228;top:41;height:12;"
      id="dpr_wrk_prj_wrk_gch_GanttChart00006">
   <div style="display:none;">Initialize</div>
   <div style="display:none;">07/01/2002 00:00:00</div>
   <div style="display:none;">2678400000</div>
   <div style="display:none;"></div>
   <div style="display:none;">X</div>
   <div style="display:none;">X</div>
</div>
```

A corresponding example using attributes for properties information is shown in Table 7 below.

TABLE 7

```
<div class="pgxGChBar"
      style=" left:667;width:228;top:41;height:12;"
      id=" dpr_wrk_prj_wrk_gch_GanttChart00006"
      description="Initialize"
      start="07/01/2002 00:00:00"
      duration="2678400000"
      linkable=""
      moveable="X"
```

TABLE 7-continued

```
      resizeable="X">
</div>
```

The definition of the referenced style sheet class is shown in Table 8 below.

TABLE 8

```
.pgxGChBar
{
   BORDER: #323369 1px solid;
   FONT-SIZE: 0px;
   Z-INDEX: 104;
   POSITION: absolute;
   BACKGROUND-COLOR: white;
}
```

HTML for Interaction Dialog

The HTML code contains elements that are used for the interaction dialog on the client side, i.e. within the client application 206. Style attributes (visibility: hidden) define elements to not be visible for display. JavaScript functions are able to access each of the hidden elements by accessing the unique ID associated with each element. The JavaScript functions make the hidden elements visible during interaction.

The following example in Table 9 below shows HTML elements for a moveable bar and a tooltip window. The style attributes are defined in style sheet classes.

TABLE 9

```
<div class="pgxGChBarMov"
     id="dpr_wrk_prj_wrk_gch_GanttChartMbb"></div>
<table class="pgxGChToolTip"
     id="dpr_wrk_prj_wrk_gch_GanttChartTip">
   <tr>
     <th colspan=2
        id="dpr_wrk_prj_wrk_gch_GanttChartTipTitle"></th>
   </tr>
   <tr>
     <td id="dpr_wrk_prj_wrk_gch_GanttChartTipArg1"></td>
     <td id="dpr_wrk_prj_wrk_gch_GanttChartTipArg1Val"></td>
   </tr>
   <tr>
     <td id="dpr_wrk_prj_wrk_gch_GanttChartTipArg2"></td>
     <td id="dpr_wrk_prj_wrk_gch_GanttChartTipArg2Val"></td>
   </tr>
</table>
```

The HTML code also contains hidden elements (input tags) that have values assigned and have a specific meaning. The JavaScript functions on the client side can read the values assigned to the hidden elements. The JavaScript functions on the client side can also set the value of the input tags and thus store information. When a request is sent from the browser to the server, the server is able to read the possibly changed values of the input tags from the request. Thus, the hidden input tags are used to exchange information in both directions—i.e., from the Web server to the browser and vice-versa.

An example of a hidden input tag is shown in Table 10 below.

TABLE 10

```
<input name="dpr_wrk_prj_wrk_gch_GanttChartCalenderStart"
    type="hidden"
    value="20020331220000 " />
<input name="dpr_wrk_prj_wrk_gch_GanttChartCalenderTicks"
    type="hidden"
    value="11782 " />
```

Details on Client Side Script

The following describes an implementation of the JavaScript functions called by the browser in step 310 above.

JavaScript Object for Gantt Chart

The client side JavaScript is designed to build an object (in the sense of object-oriented programming) for the Gantt Chart. The constructor function of the Gantt Chart object defines and initializes the attributes and methods of the object. The values of some attributes are evaluated within the constructor from the DOM of the browser and store references to specific HTML elements.

The organization of the JavaScript as an object for the Gantt Chart is not essential for the general functionality of providing an interactive Gantt Chart. As an alternative, values can be stored in global variables or the values can be determined dynamically when needed. However, designing with the object can make the handling of the data easier, reduce the amount of coding and improve the performance of interactions.

All JavaScript functions for the Gantt Chart are defined in a file, which is referenced in the HTML header of the page. The JavaScript object for the Gantt Chart is created on the client side by a script, which is generated by the server and is embedded into the HTML code for the Gantt Chart.

The following script block in Table 11 is an example as to how the Gantt Chart object is created. The script assigns values to some attributes of the object to pass language dependent texts or user specific data (e.g. date format) from the Web server to the client (or browser).

TABLE 11

```
<script language="JavaScript">
    window.GanttChart = new
window.PgxGanttChart("dpr_wrk_prj_wrk_gch_GanttChart");
    window.GanttChart.CalenderStart=1017612000000.0 ;
    window.GanttChart.CalenderTicks=11782000.0 ;
    window.GanttChart.ContainerWidth=2018 ;
    window.GanttChart.DateFormat="YYYY/MM/TT";
    window.GanttChart.LinkTxt="Link Tasks";
    window.GanttChart.StartTxt="Start";
    window.GanttChart.EndTxt="Finish";
    window.GanttChart.PreTxt="Predecessor";
    window.GanttChart.SucTxt="Successor";
    window.GanttChart.pgxScrollTo(632 );
</script>
```

Event Handler for User Actions

All interactive functions are triggered by events, which the browser sends on, e.g., mouse actions while the mouse cursor is positioned within the Gantt Chart area. The enclosing HTML element of the Gantt Chart registers JavaScript functions to handle these events. Registered events are shown in Table 1 above.

Each event handler function receives an event object (JavaScript standard) as a parameter. The function is able to retrieve additional information from the event object (e.g. cursor position, involved HTML element, and so forth). Using this information the function decides whether and what kind of reaction is necessary.

The following example in Table 12 below shows a function that is registered on the OnMouseDown event. The function determines the name of the style sheet class assigned to the HTML element, on which the user clicked. From the name of the style sheet class the function recognizes, that the user clicked on a bar, and starts the interaction to move the bar.

TABLE 12

```
function pgxGChOnMouseDown (Event)
{
    if (!GanttChart) {
        return;
    }
    if (Event.srcElement.className.substr(0,9) = = "pgxGChBar")
    {
        GanttChart.pgxGChStartMove(Event);
    } else if (Event.srcElement.className = = "pgxGChCal") {
        GanttChart.pgxGChDoScroll(Event);
    }
}
```

Dynamic Manipulation of HTML Elements

To make interaction visible to the user, the JavaScript functions dynamically to manipulate HTML elements. That is, hidden HTML elements are switched to be visible and then hidden again. Also, text contained in the elements, the position, and style attributes of the elements are changed. The manipulations are applied to the HTML elements through the DOM.

The following function in Table 13 below shows an example of how a bar that moves with the mouse cursor is associated to the position of the clicked bar, and is made visible. A reference to the HTML element that corresponds to the movable bar is stored in an attribute of the Gantt Chart object.

TABLE 13

```
function pgxGChStartMove(Event)
{
    if (this.Container.style.cursor = = "move") {
        this.MoveMode=1;
    } else if (this.Container.style.cursor = = "e-resize") {
        this.MoveMode=2;
    } else if
(Event.srcElement.childNodes(c_linkable).innerText != "") {
        this.MoveMode=3;
    } else {
        return;
    }
    if (Event.srcElement.className = = "pgxGChBarAct") {
this.ActiveBar=document.getElementById(Event.srcElement.id.substr
(0,Event.srcElement.id.length-2));
    } else {
        this.ActiveBar=Event.srcElement;
    }
    this.OffsetX=Event.clientX;
    this.OffsetY=Event.clientY;
    this.ActualX=this.OffsetX;
    if (this.MoveMode = = 1 || this.MoveMode = = 2) {
        this.MovableBar.style.top=this.ActiveBar.style.top;
        this.MovableBar.style.left=this.ActiveBar.style.left;
this.MovableBar.style.backgroundImage=this.ActiveBar.style.
backgroundImage;
        if (this.ActiveBar.style.backgroundImage = = "") {
this.MovableBar.style.height=this.ActiveBar.style.height;
```

TABLE 13-continued

```
this.MovableBar.style.width=this.ActiveBar.style.width;
        this.MovableBar.style.borderWidth="";
        this.MovableBar.style.borderStyle="";
        this.MovableBar.style.backgroundColor="";
    } else {
        this.MovableBar.style.height=10;
        this.MovableBar.style.width=10;
        this.MovableBar.style.borderWidth="0";
        this.MovableBar.style.borderStyle="none";
        this.MovableBar.style.backgroundColor=
        "transparent";
    }
} else if (this.MoveMode = = 3) {
        this.PrevMoveMode=this.MoveMode;
        this.Container.style.cursor="hand";
        this.ActiveBar.style.borderStyle="dotted";
}
    this.MovableBar.style.visibility="visible";
    this.pgxGChShowToolTip(Event);
    this.pgxGChActualizeToolTip( );
}
```

The systems and techniques described here can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions by operating on input data and generating output. The foregoing can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

A number of embodiments of the invention have been described. Nevertheless, it will be understood that various modifications may be made without departing from the spirit and scope of the invention. For example, other scripting languages, e.g., VBScript (Visual Basic Scripting language) and other Common Gateway Interface (CGI) program code can be used. Additional interaction functions, e.g., a graphical maintenance of the percentage of completion for a task can be implemented within the Gantt Chart. An interactive Network Chart or an interactive Hierarchy Chart could be based on the same techniques as described above. For example, interaction for linking nodes of a Hierarchy Chart could be similar to linking tasks in the Gantt Chart.

For a complete description of the presented application, source code presented as Appendix A and Appendix B are attached. Appendix A contains example HTML code generated on the server for the Gantt Chart. Appendix B contains example JavaScript code containing functions for interaction on the client side.

Accordingly, other embodiments are within the scope of the following claims.

APPENDIX A

```
      <div id="dpr_wrk_prj_wrk_gch">

5        <div class="pgxGChCal"
              id="dpr_wrk_prj_wrk_gch_GanttChart"
              onmousedown="pgxGChOnMouseDown(event);"
              onmousemove="pgxGChOnMouseMove(event);"
              onmouseup="pgxGChOnMouseUp(event);"
10            onmouseout="pgxGChOnMouseOut(event);"
              style="height:464px; width:100%;">

<div class="pgxGChCalHdr" style="left:0;width:221;top:0;height:11;"
      title="2002/04/01">April '02</div>
15        <div class="pgxGChCalHdr"
      style="left:220;width:228;top:0;height:11;" title="2002/05/01">May
      '02</div>
          <div class="pgxGChCalHdr"
      style="left:447;width:221;top:0;height:11;" title="2002/06/01">June
20    '02</div>
          <div class="pgxGChCalHdr"
      style="left:667;width:229;top:0;height:11;" title="2002/07/01">July
      '02</div>
          <div class="pgxGChCalHdr"
25    style="left:895;width:228;top:0;height:11;" title="2002/08/01">August
      '02</div>
          <div class="pgxGChCalHdr"
      style="left:1122;width:221;top:0;height:11;" title="2002/09/01">September
      '02</div>
30        <div class="pgxGChCalHdr"
      style="left:1342;width:229;top:0;height:11;" title="2002/10/01">October
      '02</div>
          <div class="pgxGChCalHdr"
      style="left:1570;width:221;top:0;height:11;background:#ffffff;"
35    title="2002/11/01">November '02</div>
          <div class="pgxGChCalHdr"
      style="left:1790;width:228;top:0;height:11;" title="2002/12/01">December
      '02</div>
          <div class="pgxGChCalHdr"
40    style="left:0;width:23;top:11;height:11;">01.</div>
          <div class="pgxGChCalHdr"
      style="left:22;width:23;top:11;height:11;">04.</div>
          <div class="pgxGChCalHdr"
      style="left:44;width:23;top:11;height:11;">07.</div>
45        <div class="pgxGChCalHdr"
      style="left:66;width:23;top:11;height:11;">10.</div>
          <div class="pgxGChCalHdr"
      style="left:88;width:23;top:11;height:11;">13.</div>
          <div class="pgxGChCalHdr"
50    style="left:110;width:23;top:11;height:11;">16.</div>
          <div class="pgxGChCalHdr"
      style="left:132;width:23;top:11;height:11;">19.</div>
```

```
        <div class="pgxGChCalHdr"
style="left:154;width:23;top:11;height:11;">22.</div>
        <div class="pgxGChCalHdr"
style="left:176;width:23;top:11;height:11;">25.</div>
        <div class="pgxGChCalHdr"
style="left:198;width:23;top:11;height:11;">28.</div>
        <div class="pgxGChCalHdr"
style="left:220;width:23;top:11;height:11;">01.</div>
        <div class="pgxGChCalHdr"
style="left:242;width:23;top:11;height:11;">04.</div>
        <div class="pgxGChCalHdr"
style="left:264;width:23;top:11;height:11;">07.</div>
        <div class="pgxGChCalHdr"
style="left:286;width:23;top:11;height:11;">10.</div>
        <div class="pgxGChCalHdr"
style="left:308;width:23;top:11;height:11;">13.</div>
        <div class="pgxGChCalHdr"
style="left:330;width:23;top:11;height:11;">16.</div>
        <div class="pgxGChCalHdr"
style="left:352;width:23;top:11;height:11;">19.</div>
        <div class="pgxGChCalHdr"
style="left:374;width:23;top:11;height:11;">22.</div>
        <div class="pgxGChCalHdr"
style="left:396;width:23;top:11;height:11;">25.</div>
        <div class="pgxGChCalHdr"
style="left:418;width:23;top:11;height:11;">28.</div>
        <div class="pgxGChCalHdr"
style="left:440;width:23;top:11;height:11;">31.</div>
        <div class="pgxGChCalHdr"
style="left:462;width:23;top:11;height:11;">03.</div>
        <div class="pgxGChCalHdr"
style="left:484;width:23;top:11;height:11;">06.</div>
        <div class="pgxGChCalHdr"
style="left:506;width:23;top:11;height:11;">09.</div>
        <div class="pgxGChCalHdr"
style="left:528;width:23;top:11;height:11;">12.</div>
        <div class="pgxGChCalHdr"
style="left:550;width:23;top:11;height:11;">15.</div>
        <div class="pgxGChCalHdr"
style="left:572;width:23;top:11;height:11;">18.</div>
        <div class="pgxGChCalHdr"
style="left:594;width:23;top:11;height:11;">21.</div>
        <div class="pgxGChCalHdr"
style="left:616;width:23;top:11;height:11;">24.</div>
        <div class="pgxGChCalHdr"
style="left:638;width:23;top:11;height:11;">27.</div>
        <div class="pgxGChCalHdr"
style="left:660;width:23;top:11;height:11;">30.</div>
        <div class="pgxGChCalHdr"
style="left:682;width:23;top:11;height:11;">03.</div>
        <div class="pgxGChCalHdr"
style="left:704;width:23;top:11;height:11;">06.</div>
        <div class="pgxGChCalHdr"
style="left:726;width:23;top:11;height:11;">09.</div>
```

```
        <div class="pgxGChCalHdr"
style="left:748;width:23;top:11;height:11;">12.</div>
        <div class="pgxGChCalHdr"
style="left:770;width:23;top:11;height:11;">15.</div>
        <div class="pgxGChCalHdr"
style="left:792;width:23;top:11;height:11;">18.</div>
        <div class="pgxGChCalHdr"
style="left:814;width:23;top:11;height:11;">21.</div>
        <div class="pgxGChCalHdr"
style="left:836;width:23;top:11;height:11;">24.</div>
        <div class="pgxGChCalHdr"
style="left:858;width:23;top:11;height:11;">27.</div>
        <div class="pgxGChCalHdr"
style="left:880;width:23;top:11;height:11;">30.</div>
        <div class="pgxGChCalHdr"
style="left:902;width:23;top:11;height:11;">02.</div>
        <div class="pgxGChCalHdr"
style="left:924;width:23;top:11;height:11;">05.</div>
        <div class="pgxGChCalHdr"
style="left:946;width:23;top:11;height:11;">08.</div>
        <div class="pgxGChCalHdr"
style="left:968;width:23;top:11;height:11;">11.</div>
        <div class="pgxGChCalHdr"
style="left:990;width:23;top:11;height:11;">14.</div>
        <div class="pgxGChCalHdr"
style="left:1012;width:23;top:11;height:11;">17.</div>
        <div class="pgxGChCalHdr"
style="left:1034;width:23;top:11;height:11;">20.</div>
        <div class="pgxGChCalHdr"
style="left:1056;width:23;top:11;height:11;">23.</div>
        <div class="pgxGChCalHdr"
style="left:1078;width:23;top:11;height:11;">26.</div>
        <div class="pgxGChCalHdr"
style="left:1100;width:23;top:11;height:11;">29.</div>
        <div class="pgxGChCalHdr"
style="left:1122;width:23;top:11;height:11;">01.</div>
        <div class="pgxGChCalHdr"
style="left:1144;width:23;top:11;height:11;">04.</div>
        <div class="pgxGChCalHdr"
style="left:1166;width:23;top:11;height:11;">07.</div>
        <div class="pgxGChCalHdr"
style="left:1188;width:23;top:11;height:11;">10.</div>
        <div class="pgxGChCalHdr"
style="left:1210;width:23;top:11;height:11;">13.</div>
        <div class="pgxGChCalHdr"
style="left:1232;width:23;top:11;height:11;">16.</div>
        <div class="pgxGChCalHdr"
style="left:1254;width:23;top:11;height:11;">19.</div>
        <div class="pgxGChCalHdr"
style="left:1276;width:23;top:11;height:11;">22.</div>
        <div class="pgxGChCalHdr"
style="left:1298;width:23;top:11;height:11;">25.</div>
        <div class="pgxGChCalHdr"
style="left:1320;width:23;top:11;height:11;">28.</div>
```

```
        <div class="pgxGChCalHdr"
style="left:1342;width:23;top:11;height:11;">01.</div>
        <div class="pgxGChCalHdr"
style="left:1364;width:23;top:11;height:11;">04.</div>
        <div class="pgxGChCalHdr"
style="left:1386;width:23;top:11;height:11;">07.</div>
        <div class="pgxGChCalHdr"
style="left:1408;width:23;top:11;height:11;">10.</div>
        <div class="pgxGChCalHdr"
style="left:1430;width:23;top:11;height:11;">13.</div>
        <div class="pgxGChCalHdr"
style="left:1452;width:23;top:11;height:11;">16.</div>
        <div class="pgxGChCalHdr"
style="left:1474;width:23;top:11;height:11;">19.</div>
        <div class="pgxGChCalHdr"
style="left:1496;width:23;top:11;height:11;">22.</div>
        <div class="pgxGChCalHdr"
style="left:1518;width:23;top:11;height:11;">25.</div>
        <div class="pgxGChCalHdr"
style="left:1540;width:23;top:11;height:11;">28.</div>
        <div class="pgxGChCalHdr"
style="left:1562;width:23;top:11;height:11;">31.</div>
        <div class="pgxGChCalHdr"
style="left:1584;width:23;top:11;height:11;">03.</div>
        <div class="pgxGChCalHdr"
style="left:1606;width:23;top:11;height:11;">06.</div>
        <div class="pgxGChCalHdr"
style="left:1628;width:23;top:11;height:11;">09.</div>
        <div class="pgxGChCalHdr"
style="left:1650;width:23;top:11;height:11;">12.</div>
        <div class="pgxGChCalHdr"
style="left:1672;width:23;top:11;height:11;">15.</div>
        <div class="pgxGChCalHdr"
style="left:1694;width:23;top:11;height:11;">18.</div>
        <div class="pgxGChCalHdr"
style="left:1716;width:23;top:11;height:11;">21.</div>
        <div class="pgxGChCalHdr"
style="left:1738;width:23;top:11;height:11;background:#ffffff;">24.</div>
        <div class="pgxGChCalHdr"
style="left:1760;width:23;top:11;height:11;">27.</div>
        <div class="pgxGChCalHdr"
style="left:1782;width:23;top:11;height:11;">30.</div>
        <div class="pgxGChCalHdr"
style="left:1804;width:23;top:11;height:11;">03.</div>
        <div class="pgxGChCalHdr"
style="left:1826;width:23;top:11;height:11;">06.</div>
        <div class="pgxGChCalHdr"
style="left:1848;width:23;top:11;height:11;">09.</div>
        <div class="pgxGChCalHdr"
style="left:1870;width:23;top:11;height:11;">12.</div>
        <div class="pgxGChCalHdr"
style="left:1892;width:23;top:11;height:11;">15.</div>
        <div class="pgxGChCalHdr"
style="left:1914;width:23;top:11;height:11;">18.</div>
```

```
        <div class="pgxGChCalHdr"
style="left:1936;width:23;top:11;height:11;">21.</div>
        <div class="pgxGChCalHdr"
style="left:1958;width:23;top:11;height:11;">24.</div>
        <div class="pgxGChCalHdr"
style="left:1980;width:23;top:11;height:11;">27.</div>
        <div class="pgxGChCalHdr"
style="left:2002;width:16;top:11;height:11;">30.</div>
        <div class="pgxGChCalBdy"
style="left:0;width:221;top:21.0;height:425.0;"></div>
        <div class="pgxGChCalBdy"
style="left:220;width:228;top:21.0;height:425.0;"></div>
        <div class="pgxGChCalBdy"
style="left:447;width:221;top:21.0;height:425.0;"></div>
        <div class="pgxGChCalBdy"
style="left:667;width:229;top:21.0;height:425.0;"></div>
        <div class="pgxGChCalBdy"
style="left:895;width:228;top:21.0;height:425.0;"></div>
        <div class="pgxGChCalBdy"
style="left:1122;width:221;top:21.0;height:425.0;"></div>
        <div class="pgxGChCalBdy"
style="left:1342;width:229;top:21.0;height:425.0;"></div>
        <div class="pgxGChCalBdy"
style="left:1570;width:221;top:21.0;height:425.0;"></div>
        <div class="pgxGChCalBdy"
style="left:1790;width:228;top:21.0;height:425.0;"></div>
        <div class="pgxGChCalBdy"
style="left:1750;width:0;top:21.0;height:425.0;border-left:1px dotted;
border-right:0;"></div>

<div id="dpr_wrk_prj_wrk_gch_GanttChartBdy">
        <div class="pgxGChBar"
style="left:667;width:1350;top:24;height:12;border-right:1px dotted;"
id="dpr_wrk_prj_wrk_gch_GanttChart00007"><div style="display:none;">New
Product 2003</div><div style="display:none;">07/01/2002 00:00:00</div><div
style="display:none;">31536000000 </div><div
style="display:none;"></div><div style="display:none;">X</div><div
style="display:none;">X</div></div>
        <div class="pgxGChBar" style="left:667;width:228;top:41;height:12;"
id="dpr_wrk_prj_wrk_gch_GanttChart00006"><div
style="display:none;">Initialize</div><div
style="display:none;">07/01/2002 00:00:00</div><div
style="display:none;">2678400000 </div><div
style="display:none;"></div><div style="display:none;">X</div><div
style="display:none;">X</div></div>
        <div class="pgxGChBarImg" style="background-image:
url(../cProjects/Icons/icon_time_pointer.gif);left:824;top:75;"
id="dpr_wrk_prj_wrk_gch_GanttChart00009"><div style="display:none;">Market
Opportunities</div><div style="display:none;">07/23/2002
00:00:00</div><div style="display:none;">0 </div><div
style="display:none;"></div><div style="display:none;">X</div><div
style="display:none;"></div></div>
        <div class="pgxGChBar" style="left:667;width:66;top:92;height:12;"
id="dpr_wrk_prj_wrk_gch_GanttChart00011"><div
```

```
        style="display:none;">US</div><div style="display:none;">07/01/2002
        00:00:00</div><div style="display:none;">777600000 </div><div
        style="display:none;">3D2C153F14E61E9EE10000009B383106</div><div
        style="display:none;"></div><div style="display:none;">X</div></div>
            <div class="pgxGChBarAct"
        style="left:668;width:64;top:93;height:10;"
        id="dpr_wrk_prj_wrk_gch_GanttChart00011:A"><div
        style="display:none;">US</div><div style="display:none;">07/01/2002
        00:00:00</div><div style="display:none;">777600000 </div><div
        style="display:none;">3D2C153F14E61E9EE10000009B383106</div><div
        style="display:none;"></div><div style="display:none;">X</div></div>
            <div class="pgxGChBar" style="left:667;width:162;top:109;height:12;"
        id="dpr_wrk_prj_wrk_gch_GanttChart00012"><div
        style="display:none;">EMEA</div><div style="display:none;">07/01/2002
        00:00:00</div><div style="display:none;">1900800000 </div><div
        style="display:none;">3D2C153F14E61E9EE10000009B383106</div><div
        style="display:none;"></div><div style="display:none;">X</div></div>
            <div class="pgxGChBarAct"
        style="left:668;width:47;top:110;height:10;"
        id="dpr_wrk_prj_wrk_gch_GanttChart00012:A"><div
        style="display:none;">EMEA</div><div style="display:none;">07/01/2002
        00:00:00</div><div style="display:none;">570240000 </div><div
        style="display:none;">3D2C153F14E61E9EE10000009B383106</div><div
        style="display:none;"></div><div style="display:none;">X</div></div>
            <div class="pgxGChBarImg" style="background-image:
        url(../cProjects/Icons/icon_time_pointer.gif);left:890;top:126;"
        id="dpr_wrk_prj_wrk_gch_GanttChart00010"><div style="display:none;">Func.
        Structure</div><div style="display:none;">08/01/2002 00:00:00</div><div
        style="display:none;">0 </div><div style="display:none;"></div><div
        style="display:none;">X</div><div style="display:none;"></div></div>
            <div class="pgxGChBar" style="left:895;width:425;top:143;height:12;"
        id="dpr_wrk_prj_wrk_gch_GanttChart00005"><div
        style="display:none;">Define</div><div style="display:none;">08/01/2002
        00:00:00</div><div style="display:none;">5011200000 </div><div
        style="display:none;"></div><div style="display:none;">X</div><div
        style="display:none;">X</div></div>
            <div class="pgxGChBar" style="left:895;width:124;top:160;height:12;"
        id="dpr_wrk_prj_wrk_gch_GanttChart00013"><div
        style="display:none;">Product</div><div style="display:none;">08/01/2002
        00:00:00</div><div style="display:none;">1468800000 </div><div
        style="display:none;">3D2C154714E61E9EE10000009B383106</div><div
        style="display:none;">X</div><div style="display:none;">X</div></div>
            <div class="pgxGChBar"
        style="left:1027;width:124;top:177;height:12;"
        id="dpr_wrk_prj_wrk_gch_GanttChart00014"><div
        style="display:none;">Equipment</div><div style="display:none;">08/19/2002
        00:00:00</div><div style="display:none;">1468800000 </div><div
        style="display:none;">3D2C154714E61E9EE10000009B383106</div><div
        style="display:none;">X</div><div style="display:none;">X</div></div>
            <div class="pgxGChBar"
        style="left:1151;width:125;top:194;height:12;"
        id="dpr_wrk_prj_wrk_gch_GanttChart00015"><div
        style="display:none;">Personel</div><div style="display:none;">09/05/2002
        00:00:00</div><div style="display:none;">1468800000 </div><div
```

```
        style="display:none;">3D2C154714E61E9EE10000009B383106</div><div
        style="display:none;">X</div><div style="display:none;">X</div></div>
            <div class="pgxGChBar"
        style="left:1320;width:697;top:211;height:12;border-right:1px dotted;"
        id="dpr_wrk_prj_wrk_gch_GanttChart00004"><div
        style="display:none;">Develop</div><div style="display:none;">09/28/2002
        00:00:00</div><div style="display:none;">10890000000 </div><div
        style="display:none;"></div><div style="display:none;">X</div><div
        style="display:none;">X</div></div>
            <div class="pgxGChHLin" style="left:1019;top:166;width:10;"></div>
            <div class="pgxGChHLin" style="left:1017;top:183;width:10;"></div>
            <div class="pgxGChRelAr" style="left:1017;top:179;"></div>
            <div class="pgxGChHLin" style="left:1151;top:183;width:10;"></div>
            <div class="pgxGChHLin" style="left:1141;top:200;width:10;"></div>
            <div class="pgxGChRelAr" style="left:1141;top:196;"></div>
            <div class="pgxGChHLin" style="left:1017;top:174;width:12;"></div>
            <div class="pgxGChHLin" style="left:1141;top:191;width:20;"></div>
            <div class="pgxGChVLin" style="left:1017;top:174;height:9;"></div>
            <div class="pgxGChVLin" style="left:1029;top:166;height:8;"></div>
            <div class="pgxGChVLin" style="left:1141;top:191;height:9;"></div>
            <div class="pgxGChVLin" style="left:1161;top:183;height:8;"></div>
            </div>

<div class="pgxGChBarMov"
        id="dpr_wrk_prj_wrk_gch_GanttChartMbb"></div>

<table class="pgxGChToolTip" id="dpr_wrk_prj_wrk_gch_GanttChartTip">
              <tr>
                <th colspan=2 id="dpr_wrk_prj_wrk_gch_GanttChartTipTitle"></th>
              </tr>
              <tr>
                <td id="dpr_wrk_prj_wrk_gch_GanttChartTipArg1"></td>
                <td id="dpr_wrk_prj_wrk_gch_GanttChartTipArg1Val"></td>
              </tr>
              <tr>
                <td id="dpr_wrk_prj_wrk_gch_GanttChartTipArg2"></td>
                <td id="dpr_wrk_prj_wrk_gch_GanttChartTipArg2Val"></td>
              </tr>
            </table>

<input name="dpr_wrk_prj_wrk_gch_GanttChartCalenderStart"
        type="hidden" value="20020331220000 " />
            <input name="dpr_wrk_prj_wrk_gch_GanttChartCalenderTicks"
        type="hidden" value="11782 " />
            <input name="dpr_wrk_prj_wrk_gch_GanttChartClientWidth"
        id="dpr_wrk_prj_wrk_gch_GanttChartClientWidth" type="hidden" />
            <input name="dpr_wrk_prj_wrk_gch_GanttChartScrollLeft"
        id="dpr_wrk_prj_wrk_gch_GanttChartScrollLeft" type="hidden" value="632 "
        />

</div>

<script language="JavaScript">
```

```
            window.GanttChart = new
    window.PgxGanttChart("dpr_wrk_prj_wrk_gch_GanttChart","htmlbSubmitLib('htm
    lb',source,'PrjGrafX:ganttChart:chart:null::CL_PRJGRAFX_EVENT_GCH::none','
    theForm',objectId,eventName,paramCount
5   ,param1,param2,param3,param4,param5,param6,param7,param8,param9);return
    false;");
            window.GanttChart.CalenderStart=1017612000000.0 ;
            window.GanttChart.CalenderTicks=11782000.0 ;
            window.GanttChart.ContainerWidth=2018 ;
10          window.GanttChart.DateFormat="YYYY/MM/TT";
            window.GanttChart.LinkTxt="Link Tasks";
            window.GanttChart.StartTxt="Start";
            window.GanttChart.EndTxt="Finish";
            window.GanttChart.PreTxt="Predecessor";
15          window.GanttChart.SucTxt="Successor";
            window.GanttChart.pgxScrollTo(632 );
    </script>
```

APPENDIX B

```
        var GanttChart;

5       var c_description=0;
        var c_start=1;
        var c_duration=2;
        var c_linkable=3;
        var c_moveable=4;
10      var c_resizeable=5;

// Constructor
        function PgxGanttChart(ContainerId, submitFunction)
        {
15       // Attributes
          this.ContainerId=ContainerId;
          this.ContainerWidth;
          this.ActiveBar;
          this.TargetBar;
20        this.MoveMode=0;
          this.PrevMoveMode;
          this.OffsetX;
          this.OffsetY;
          this.ActualX;
25        this.CalenderStart;
          this.CalenderTicks;
          this.DateFormat;
          this.LinkTxt;
          this.StartTxt;
30        this.EndTxt;
          this.SucTxt;
          this.PreTxt;
          this.Container=document.getElementById(this.ContainerId);
          this.MovableBar=document.getElementById(this.ContainerId + "Mbb");
35        this.ToolTip=document.getElementById(this.ContainerId + "Tip");
          this.ToolTipTitle=document.getElementById(this.ContainerId + "TipTitle");
          this.ToolTipArg1=document.getElementById(this.ContainerId + "TipArg1");
40        this.ToolTipArg1Val=document.getElementById(this.ContainerId + "TipArg1Val");
          this.ToolTipArg2=document.getElementById(this.ContainerId + "TipArg2");
          this.ToolTipArg2Val=document.getElementById(this.ContainerId + "TipArg2Val");
45        this.ToolTipArg2Val=document.getElementById(this.ContainerId + "TipArg2Val");
          this.varClientWidth=document.getElementById(this.ContainerId + "ClientWidth");
          this.varScrollLeft=document.getElementById(this.ContainerId + "ScrollLeft");
50        this.varClientWidth.value=this.Container.clientWidth;
          this.varScrollLeft.value=this.Container.scrollLeft;
          // Methods
          this.pgxGChChangeDyn=pgxGChChangeDyn;
```

```
          this.pgxGChSwitchMode=pgxGChSwitchMode;
          this.pgxGChStartMove=pgxGChStartMove;
          this.pgxGChDoMove=pgxGChDoMove;
          this.pgxGChStopMove=pgxGChStopMove;
 5        this.pgxGChDoScroll=pgxGChDoScroll;
          this.pgxGChShowToolTip=pgxGChShowToolTip;
          this.pgxGChHideToolTip=pgxGChHideToolTip;
          this.pgxGChActualizeToolTip=pgxGChActualizeToolTip;
          this.WriteDate=WriteDate;
10        this.WriteDateFrag=WriteDateFrag;
          this.scrollCalender=scrollCalender;
          this.moveBar=moveBar;
          this.resizeBar=resizeBar;
          this.linkBar=linkBar;
15        this.pgxScrollTo=pgxScrollTo;
          this.doSubmit=new
   Function("source","objectId","eventName","paramCount","param1","param2","p
   aram3","param4","param5","param6","param7","param8","param9",submitFunctio
   n);
20        } function scrollCalender(direction)
          {
             this.doSubmit(this.Container,
25           this.ContainerId, "scroll", 1,
             direction);
          } function moveBar()
30        {
             this.doSubmit(this.Container,
             this.ContainerId, "moveBar", 4,
             this.ActiveBar.id,
             this.ToolTipArg1Val.innerHTML,
35           this.ToolTipArg2Val.innerHTML,
             "");
          } function resizeBar()
40        {
             this.doSubmit(this.Container,
             this.ContainerId, "resizeBar", 4,
             this.ActiveBar.id,
             this.ToolTipArg1Val.innerHTML,
45           this.ToolTipArg2Val.innerHTML,
             "");
          } function linkBar()
50        {
             this.doSubmit(this.Container,
             this.ContainerId, "linkBar", 2,
             this.ActiveBar.id,
             this.TargetBar.id);
```

```
        } function pgxScrollTo(position)
        {
          this.Container.scrollLeft=position;
          this.varScrollLeft.value=position;
        } function pgxGChOnMouseDown(Event)
        {
          if (!GanttChart) {
            return;
          } if (Event.srcElement.className.substr(0,9) == "pgxGChBar") {
            GanttChart.pgxGChStartMove(Event);
          } else if (Event.srcElement.className == "pgxGChCal") {
            GanttChart.pgxGChDoScroll(Event);
          }
        } function pgxGChStartMove(Event)
        {
          if (this.Container.style.cursor == "move") {
            this.MoveMode=1;
          } else if (this.Container.style.cursor == "e-resize") {
            this.MoveMode=2;
          } else if (Event.srcElement.childNodes(c_linkable).innerText !=
"") {
            this.MoveMode=3;
          } else {
            return;
          } if (Event.srcElement.className == "pgxGChBarAct") { this.ActiveBar=document.getElementById(Event.srcElement.id.substr(0,Event.
srcElement.id.length-2));
          } else {
            this.ActiveBar=Event.srcElement;
          }
          this.OffsetX=Event.clientX;
          this.OffsetY=Event.clientY;
          this.ActualX=this.OffsetX;

if (this.MoveMode == 1 || this.MoveMode == 2) {
            this.MovableBar.style.top=this.ActiveBar.style.top;
            this.MovableBar.style.left=this.ActiveBar.style.left;

this.MovableBar.style.backgroundImage=this.ActiveBar.style.backgroundImage
;
            if (this.ActiveBar.style.backgroundImage == "") {
              this.MovableBar.style.height=this.ActiveBar.style.height;
              this.MovableBar.style.width=this.ActiveBar.style.width;
```

```
            this.MovableBar.style.borderWidth="";
            this.MovableBar.style.borderStyle="";
            this.MovableBar.style.backgroundColor="";
          } else {
            this.MovableBar.style.height=10;
            this.MovableBar.style.width=10;
            this.MovableBar.style.borderWidth="0";
            this.MovableBar.style.borderStyle="none";
            this.MovableBar.style.backgroundColor="transparent";
          }
        } else if (this.MoveMode == 3) {
            this.PrevMoveMode=this.MoveMode;
            this.Container.style.cursor="hand";
            this.ActiveBar.style.borderStyle="dotted";
        }
        this.MovableBar.style.visibility="visible";

this.pgxGChShowToolTip(Event);
        this.pgxGChActualizeToolTip();
      } function pgxGChStopMove()
      {
        this.MovableBar.style.visibility="hidden";
        if (this.ActiveBar.style.backgroundImage == "") {
           this.ActiveBar.style.borderStyle="solid";
        }
        this.ActiveBar=null;
        this.MoveMode=0;
        if (this.TargetBar) {
           this.TargetBar.style.borderStyle="solid";
           this.TargetBar=null;
        }
        this.pgxGChHideToolTip();
      } function pgxGChDoScroll(Event)
      {
        var element=Event.srcElement;
        var xPos=Event.clientX;
        var yPos=Event.clientY;

if ( Event.button == 1 &&
             element.componentFromPoint(xPos, yPos) == "scrollbarLeft" &&
             element.scrollLeft == 0) {
          this.scrollCalender('LEFT');
        }
        if ( Event.button == 1 &&
             element.componentFromPoint(xPos, yPos) == "scrollbarRight" &&
             element.scrollLeft >= this.ContainerWidth -
element.scrollWidth ) {
          this.scrollCalender('RIGHT');
        }
      }
```

32

```
function pgxGChOnMouseUp(Event)
{
  if (!GanttChart) {
    return;
  } switch(GanttChart.MoveMode)
  {
    case 0:
      return;
      break;
    case 1:
      if (GanttChart.OffsetX != GanttChart.ActualX) {
        GanttChart.moveBar();
      }
      break;
    case 2:
      if (GanttChart.OffsetX != GanttChart.ActualX) {
        GanttChart.resizeBar();
      }
      break;
    case 3:
      if (GanttChart.TargetBar) {
        GanttChart.linkBar();
      }
      break;
  }
  GanttChart.pgxGChStopMove();
} function pgxGChOnMouseOut(Event)
{
  if (!GanttChart) {
    return;
  }
  if (GanttChart.MoveMode == 0) {
    return;
  }
  if (Event.toElement == null) {
    return;
  }
  if (Event.toElement.id.substr(0, GanttChart.ContainerId.length) == GanttChart.ContainerId) {
    return;
  }
  if (Event.toElement.className.substr(0,6) != "pgxGCh") {
    GanttChart.pgxGChStopMove();
  }
} function pgxGChOnMouseMove(Event)
{
  if (!GanttChart) {
```

```
        return;
      }

// Store scroll info
      GanttChart.varClientWidth.value=GanttChart.Container.clientWidth;
      GanttChart.varScrollLeft.value=GanttChart.Container.scrollLeft;

if (GanttChart.MoveMode == 0) {
        GanttChart.pgxGChChangeDyn(Event);
      } else {
        GanttChart.pgxGChSwitchMode(Event);
        GanttChart.pgxGChDoMove(Event);
        GanttChart.pgxGChActualizeToolTip(Event.SrcElement);
      }
    } function pgxGChChangeDyn(Event)
    {
      var element=Event.srcElement;
      var tooltipHidden=true;
      var resizeArea=10;
      var width;

if (this.TargetBar || this.ActiveBar) {
        this.pgxGChStopMove();
      } if (element.className) {
        if (element.className == "pgxGChBar") {
          width=parseInt(element.style.width);
          if (resizeArea > 0.5*width) {
            resizeArea = 0.5*width;
          }
          if ((parseInt(element.style.width) - Event.offsetX) > resizeArea) {
            if (element.childNodes(c_moveable).innerText != "") {
              this.Container.style.cursor="move";
            } else {
              this.Container.style.cursor="auto";
            }
          } else {
            if (element.childNodes(c_resizeable).innerText != "") {
              this.Container.style.cursor="e-resize";
            } else if (element.childNodes(c_moveable).innerText != "") {
              this.Container.style.cursor="move";
            }
          }
          tooltipHidden=false;
        } else if (element.className == "pgxGChBarImg") {
          if (element.childNodes(c_moveable).innerText != "") {
            this.Container.style.cursor="move";
          } else {
            this.Container.style.cursor="auto";
          }
```

```
            tooltipHidden=false;
        } else if (element.className == "pgxGChBarAct") {
            tooltipHidden=false;
        }
    }
    if (tooltipHidden == false) {
        if (this.ToolTip.style.visibility != "visible") {
          this.pgxGChShowToolTip(Event);
        }
    } else {
        this.Container.style.cursor="auto";
        if (this.ToolTip.style.visibility != "hidden") {
          this.pgxGChHideToolTip();
        }
    }
} function pgxGChSwitchMode(Event)
{
  var element=Event.srcElement;
  var yPos=Event.clientY;

if (Event.button == 0) {
    this.pgxGChStopMove();
    return;
  } if (this.MoveMode == 1 || this.MoveMode == 2) {
    if (Math.abs(yPos - this.OffsetY) > 15 &&
        this.ActiveBar.childNodes(c_linkable).innerText !="") {
//    Switch on link mode
      this.PrevMoveMode=this.MoveMode;
      this.MoveMode=3;
      this.Container.style.cursor="hand";
      this.MovableBar.style.visibility="hidden";
      if (this.ActiveBar.className == "pgxGChBar") {
        this.ActiveBar.style.borderStyle="dotted";
      }
      this.pgxGChShowToolTip(Event);
    }
  } else if (this.MoveMode == 3) {
    if (Math.abs(yPos - this.OffsetY) < 15) {
      if (this.MoveMode != this.PrevMoveMode) {
//      Switch off link mode - set previous mode
        this.MoveMode=this.PrevMoveMode;
        this.MovableBar.style.visibility="visible";
        if (this.ActiveBar.className == "pgxGChBar") {
           this.ActiveBar.style.borderStyle="solid";
        }
        if (this.MoveMode == 1) {
           this.Container.style.cursor="move";
        } else {
           this.Container.style.cursor="e-resize";
        }
```

```
            if (this.TargetBar) {
              this.TargetBar.style.borderStyle="solid";
              this.TargetBar=null;
            }
            this.pgxGChShowToolTip(Event);
          }
        } else {
          if (element.className == "pgxGChBarAct") {
element=document.getElementById(element.id.substr(0,element.id.length-2));
          }
          if (element.className.substr(0,9) == "pgxGChBar") {
            if (element.childNodes(c_linkable).innerText ==
this.ActiveBar.childNodes(c_linkable).innerText) {
              this.TargetBar=element;
              if (this.TargetBar.className == "pgxGChBar") {
                 this.TargetBar.style.borderStyle="dotted";
              }
            }
          } else {
            if (this.TargetBar) {
              if (this.TargetBar.className == "pgxGChBar") {
                this.TargetBar.style.borderStyle="solid";
              }
              this.TargetBar=null;
            }
          }
        }
      } function pgxGChDoMove(Event)
      {
        var element=Event.srcElement;
        var myWidth;

this.ActualX=Event.clientX;

switch(this.MoveMode)
        {
          case 1:
this.MovableBar.style.left=(parseInt(this.ActiveBar.style.left) +
this.ActualX - this.OffsetX) + "px";
            break;
          case 2:
            myWidth=parseInt(this.ActiveBar.style.width) + this.ActualX -
this.OffsetX;
            if ((myWidth) > 2)
            {
              this.MovableBar.style.width=(myWidth) + "px";
            }
            break;
        }
```

```
            myCount=1;
            myOffsetY=Event.offsetY;
            myOffsetX=Event.offsetX;
            myElement=element;
            while( myElement != this.ToolTip && myCount < 4)
            {
              myOffsetY += myElement.offsetTop;
              myOffsetX += myElement.offsetLeft;
              myElement=myElement.parentNode;
              myCount++;
            }
            if (myElement == this.ToolTip) {
              if (myOffsetY < this.ToolTip.offsetHeight - myOffsetY) {
                 myBorder=1;
                 myDMin=myOffsetY;
              } else {
                 myBorder=2;
                 myDMin=this.ToolTip.offsetHeight - myOffsetY;
              }
              if (myOffsetX < myDMin) {
                 myBorder=3;
                 myDMin=myOffsetX;
              }
              if (this.ToolTip.offsetWidth - myOffsetX < myDMin) {
                 myBorder=4;
                 myDMin=this.ToolTip.offsetWidth - myOffsetX;
              }
              switch(myBorder)
              {
                 case 1:
                   if (this.ToolTip.offsetTop + 25 + this.ToolTip.offsetHeight
   < this.Container.clientHeight) {
                     myDMin=25;
                   } else {
                     myDMin=-25 - this.ToolTip.offsetHeight;
                   }
                   this.ToolTip.style.top=(this.ToolTip.offsetTop + myDMin) +
   "px";
                   break;
                 case 2:
                   if (this.ToolTip.offsetTop - 25 > 0) {
                     myDMin=-25;
                   } else {
                     myDMin=25 + this.ToolTip.offsetHeight;
                   }
                   this.ToolTip.style.top=(this.ToolTip.offsetTop + myDMin) +
   "px";
                   break;
                 case 3:
                   if (this.ToolTip.offsetLeft + 25 + this.ToolTip.offsetWidth
   < this.Container.scrollLeft + this.Container.clientWidth) {
                     myDMin=25;
                   } else {
```

```
            myDMin=-25 - this.ToolTip.offsetWidth;
          }
          this.ToolTip.style.left=(this.ToolTip.offsetLeft + myDMin) +
"px";
          break;
        case 4:
          if  (this.ToolTip.offsetLeft - 25 >
this.Container.scrollLeft) {
            myDMin=-25;
          } else {
            myDMin=25 + this.ToolTip.offsetWidth;
          }
          this.ToolTip.style.left=(this.ToolTip.offsetLeft + myDMin) +
"px";
          break;
      }
    }
  } function pgxGChShowToolTip(Event)
  {
    var element=Event.srcElement;
    var myDate;
    var myTime;
    var myPos;

switch(this.MoveMode)
    {
      case 0:
this.ToolTipTitle.innerText=element.childNodes(c_description).innerText;
        myDate = new Date(element.childNodes(c_start).innerText);
        myTime=parseInt(element.childNodes(c_duration).innerText);
        if (myTime != 0) {
           this.ToolTipArg1.innerText=this.StartTxt;
           this.ToolTipArg1Val.innerText=this.WriteDate(myDate,
this.DateFormat);
        } else {
           this.ToolTipArg1Val.innerText="";
           this.ToolTipArg1.innerText="";
        }
        myTime += myDate.getTime() - 43200000; // end date is 12pm; 12
hours hysteresis
        myDate.setTime(myTime);
        this.ToolTipArg2Val.innerText=this.WriteDate(myDate,
this.DateFormat);
        this.ToolTipArg2.innerText=this.EndTxt;
        break;
      case 1:
      case 2:

this.ToolTipTitle.innerText=this.ActiveBar.childNodes(c_description).inner
Text;
```

```
        myTime=parseInt(this.ActiveBar.childNodes(c_duration).innerText);
               if (myTime != 0) {
                  this.ToolTipArg1.innerText=this.StartTxt;
               } else {
                  this.ToolTipArg1.innerText="";
                  this.ToolTipArg1Val.innerText="";
               }
               this.ToolTipArg2.innerText=this.EndTxt;
               break;
            case 3:
               this.ToolTipTitle.innerText=this.LinkTxt;
               this.ToolTipArg1.innerText=this.PreTxt;
               this.ToolTipArg2.innerText=this.SucTxt;
        this.ToolTipArg1Val.innerText=this.ActiveBar.childNodes(c_description).inn
        erText;
               this.ToolTipArg2Val.innerText="";
               break;
         } if (this.ToolTip.style.visibility != "visible") {
            myPos=parseInt(element.style.top);
            if (myPos + 25 + this.ToolTip.offsetHeight <
        this.Container.clientHeight) {
               myPos += 25;
            } else {
               myPos -= (15 + this.ToolTip.offsetHeight);
            }
            this.ToolTip.style.top=myPos + "px";
            myPos=parseInt(element.style.left) + Event.offsetX;
            if (myPos - 75 < this.Container.scrollLeft) {
               myPos = this.Container.scrollLeft;
            } else if (myPos + 75 > this.Container.scrollLeft +
        this.Container.clientWidth) {
               myPos = this.Container.scrollLeft + this.Container.clientWidth
        - 150;
            } else {
               myPos -= 75;
            }
            this.ToolTip.style.left=myPos + "px";
            this.ToolTip.style.visibility="visible";
         }
      } function pgxGChHideToolTip()
      {
         this.ToolTip.style.visibility="hidden";
      } function pgxGChActualizeToolTip()
      {
         var myDate;
         var myTime;
```

```
            switch(this.MoveMode)
            {
               case 1:
                  myDate=new Date(this.ActiveBar.childNodes(c_start).innerText);
                  myTime=myDate.getTime() + (this.ActualX - this.OffsetX) *
this.CalenderTicks + 43200000;
                  if (parseInt(this.ActiveBar.childNodes(c_duration).innerText)
!= 0) {
                     myDate.setTime(myTime);
                     this.ToolTipArg1Val.innerText=this.WriteDate(myDate,
this.DateFormat);
                  }
                  myTime +=
parseInt(this.ActiveBar.childNodes(c_duration).innerText) - 86400000; //
end date is 12pm
                  myDate.setTime(myTime);
                  this.ToolTipArg2Val.innerText=this.WriteDate(myDate,
this.DateFormat);
                  break;
               case 2:
                  myDate=new Date(this.ActiveBar.childNodes(c_start).innerText);
                  this.ToolTipArg1Val.innerText=this.WriteDate(myDate,
this.DateFormat);
                  myTime=myDate.getTime() +
parseInt(this.ActiveBar.childNodes(c_duration).innerText);
                  myTime += (this.ActualX - this.OffsetX) * this.CalenderTicks -
43200000; // end date is 12pm;
                  myDate.setTime(myTime);
                  this.ToolTipArg2Val.innerText=this.WriteDate(myDate,
this.DateFormat);
                  break;
               case 3:
                  if (this.TargetBar)
                  {
this.ToolTipArg2Val.innerText=this.TargetBar.childNodes(c_description).inn
erText;
                  } else {
                     this.ToolTipArg2Val.innerText="";
                  }
                  break;
            }
         } function WriteDateFrag(Date, Format)
         {
            var myResult="";

switch (Format)
            {
               case "T":
                  myResult=Date.getDate();
```

```
      break;
    case "TT":
      myResult="0" + Date.getDate();
      myResult=myResult.substr(myResult.length-2,2);
      break;
    case "M":
      myResult=Date.getMonth() + 1;
      break;
    case "MM":
      myResult="0" + (Date.getMonth() + 1);
      myResult=myResult.substr(myResult.length-2,2);
      break;
    case "YY":
      myResult="00" + Date.getYear();
      myResult=myResult.substr(myResult.length-2,2);
      break;
    case "YYYY":
      myResult="0000" + Date.getYear();
      myResult=myResult.substr(myResult.length-4,4);
      break;
    case "h":
      myResult=Date.getHours();
      break;
    case "hh":
      myResult="0" + Date.getHours();
      myResult=myResult.substr(myResult.length-2,2);
      break;
    case "m":
      myResult=Date.getMinutes();
      break;
    case "mm":
      myResult="0" + Date.getMinutes();
      myResult=myResult.substr(myResult.length-2,2);
      break;
  } return myResult;
} function WriteDate(Date, Format)
{
  var myChar="";
  var myFormat="";
  var myResult="";

while (Format.length != 0)
  {
    myChar=Format.charAt(0);
    Format=Format.substring(1);
    if (myFormat.length != 0)
    {
      if (myChar == myFormat.charAt(0))
      {
```

```
        myFormat += myChar;
        continue;
      } else {
        myResult += this.WriteDateFrag(Date, myFormat);
        myFormat="";
      }
    }
    if ("TMYhm".indexOf(myChar) != -1)
    {
      myFormat=myChar;
    } else {
      myResult += myChar;
    }
  } if (myFormat.length != 0)
  {
    myResult += this.WriteDateFrag(Date, myFormat);
  } return myResult;
}
```

What is claimed is:

1. A computer-implemented method for representing a project in a web application, the method comprising:
   generating, through a Web server, a description of the project in HTML code;
   creating a graphic display of at least a portion of the project in the form of a Gantt chart in a browser, the browser including a document object model, the Gantt chart including a graphic representation of an HTML element;
   receiving user input manipulating the HTML element in the graphic display of the Gantt chart;
   storing information about a kind of, and one or more parameters of, user input manipulation in one or more hidden HTML input tags;
   sending a request to the Web server for updating the HTML code of the Gantt Chart, the Web server reading the information about the kind of, and one or more parameters of, the user input manipulation stored in the one or more hidden HTML input tags; and
   dynamically updating the graphic display of the Gantt chart in response to the request, including generating an updated description of the project in HTML code, the updated description including a plurality of instructions to manipulate the document object model of the browser.

2. The method of claim 1, wherein the Gantt Chart represents the project in the web application.

3. The method of claim 1, wherein the plurality of instructions are contained within a computer program.

4. The method of claim 3, wherein the computer program is written in a scripting language.

5. The method of claim 3, wherein the scripting language comprises a JavaScript programming language.

6. The method of claim 1, wherein generating a description of a project in HTML Code includes:
   generating HTML code that registers scripting language functions to handle events and that contains elements for interaction dialog with the user in the browser.

7. The method of claim 6, wherein the events are user input actions.

8. The method of claim 6, wherein the events are state changes of HTML elements.

9. The method of claim 6, wherein the elements comprise hidden elements not to be displayed in the browser and visible elements to be displayed in the browser.

10. A computer program product, tangibly embodied in an information carrier, for representing a project in a web application, the product comprising instructions to cause a processor to:
   generate, through a Web server, a description of the project in HTML code;
   create a graphic display of at least a portion of the project in the form of a Gantt chart in a browser, the browser including a document object model, the Gantt chart including a graphic representation of an HTML element;
   receive user input manipulating the HTML element in the graphic display of the Gantt chart;
   store information about kind of, and one or more parameters of, user input manipulation in one or more hidden HTML input tags;
   send a request to the Web server for updating the HTML code of the Gantt Chart, the Web server being operable to read the information about the kind of, and one or more parameters of, the user input manipulation stored in the one or more hidden HTML input tags; and
   dynamically update the graphic display of the Gantt chart in response to the request, including instructions to generate an updated description of the project in HTML code, the updated description including a plurality of instructions to manipulate the document object model of the browser.

11. The product of claim 10, wherein the Gantt Chart represents the project in the web application.

12. The product of claim 10, wherein the plurality of instructions are contained within a computer program.

13. The product of claim 12, wherein the computer program is written in a scripting language.

14. The product of claim 13, wherein the scripting language comprises a JavaScript programming language.

15. The product of claim 10, wherein the instructions to cause a processor to generate a description of a project in HTML Code include instructions to cause a processor to:
   generate HTML code that registers scripting language functions to handle events and that contains elements for interaction dialog with the user in the browser.

16. The product of claim 15, wherein the events are user input actions.

17. The product of claim 15, wherein the events are state changes of HTML elements.

18. The product of claim 15, wherein the elements comprise hidden elements not to be displayed in the browser and visible elements to be displayed in the browser.

19. The method of claim 1, wherein generating an updated description of the project in HTML code includes changing the one or more parameters stored in the one or more hidden HTML input tags, wherein the browser is operable to read one or more changed parameters stored in the one or more hidden HTML input tags and to update the graphic display of the chart.

20. The product of claim 10, wherein the instructions to cause a processor to generate an updated description of the project in HTML code include instructions to change the one or more parameters stored in the one or more hidden HTML input tags, wherein the browser is operable to read the one or more changed parameters stored in the one or more hidden HTML input tags and to update the graphic display of the chart.

* * * * *